United States Patent
Heng et al.

(10) Patent No.: US 11,192,807 B2
(45) Date of Patent: *Dec. 7, 2021

(54) CHLORINE-GENERATING ASSEMBLY

(71) Applicant: ZODIAC POOL SYSTEMS LLC, Carlsbad, CA (US)

(72) Inventors: Hwa Leung Heng, Carlsbad, CA (US); Richard Asplund, Carlsbad, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/857,882

(22) Filed: Apr. 24, 2020

(65) Prior Publication Data

US 2020/0247692 A1 Aug. 6, 2020

Related U.S. Application Data

(63) Continuation of application No. 15/862,208, filed on Jan. 4, 2018, now Pat. No. 10,669,171, which is a
(Continued)

(51) Int. Cl.
*C02F 1/46* (2006.01)
*C25B 1/26* (2006.01)
(Continued)

(52) U.S. Cl.
CPC .............. *C02F 1/4674* (2013.01); *C25B 1/26* (2013.01); *C02F 2103/42* (2013.01);
(Continued)

(58) Field of Classification Search
CPC .......... C02F 1/4674; C02F 2201/46145; C02F 2303/04; C02F 2103/42; C02F 2201/4611;
(Continued)

(56) References Cited

U.S. PATENT DOCUMENTS 2,874,719 A 2/1959 Tuyl
4,085,028 A 4/1978 McCallum
(Continued)

FOREIGN PATENT DOCUMENTS

AU 2015206377 7/2018
EP 3094600 8/2018
(Continued)

OTHER PUBLICATIONS

U.S. Appl. No. 14/335,996, Non-Final Office Action dated Apr. 5, 2018, 12 pages.
(Continued)

*Primary Examiner* — Joseph W Drodge
(74) *Attorney, Agent, or Firm* — Kilpatrick Townsend & Stockton LLP; Dean W. Russell; Renae B. Wainwright

(57) ABSTRACT

Assemblies designed to facilitate detection of water flow in low water flow situations. In some embodiments, the assembly includes a channel that narrows from an inlet end of the assembly to an outlet end of the assembly to increase the velocity of water flowing through the channel. In some embodiments, the assembly may also include a water delivery mechanism that delivers water flowing through the channel to a flow sensor and enables the detection of water flow, even in low flow situations.

14 Claims, 7 Drawing Sheets

Related U.S. Application Data continuation of application No. 14/598,742, filed on Jan. 16, 2015, now Pat. No. 9,878,926.

(60) Provisional application No. 61/928,469, filed on Jan. 17, 2014.

(51) Int. Cl.

| | | |
|---|---|---|
| *E04H 4/12* | (2006.01) | |
| *C02F 1/467* | (2006.01) | |
| *C02F 103/42* | (2006.01) | |

(52) U.S. Cl.
CPC . *C02F 2201/003* (2013.01); *C02F 2201/4611* (2013.01); *C02F 2201/46105* (2013.01); *C02F 2201/46145* (2013.01); *C02F 2209/40* (2013.01); *C02F 2303/04* (2013.01); *C02F 2305/02* (2013.01); *E04H 4/1281* (2013.01)

(58) Field of Classification Search
CPC ........ C02F 2201/46105; C02F 2209/40; C02F 2305/02; C02F 2201/003; C02F 1/467; C02F 1/4672; C02F 1/686; C02F 1/76; C25B 1/26; C25B 1/24; C25B 9/00; C25B 9/06; C25B 15/00; E04H 4/1281
USPC ............. 204/268, 269, 275.1, 278.5; 210/87, 210/198.1, 243, 748.01, 748.16, 748.17, 210/748.2, 753, 754, 7, 58
See application file for complete search history.

(56) References Cited

U.S. PATENT DOCUMENTS

| | | | |
|---|---|---|---|
| 4,250,126 A | | 2/1981 | Yates et al. |
| 4,274,939 A | * | 6/1981 | Bjaareklint ............... C25B 9/77 |
| | | | 204/257 |
| 4,472,256 A | | 9/1984 | Hilbig |
| 4,822,472 A | | 4/1989 | Reis et al. |
| 4,861,451 A | | 8/1989 | David et al. |
| 5,037,519 A | | 8/1991 | Wiscombe et al. |
| 5,062,940 A | | 11/1991 | Davies |
| 5,292,405 A | | 3/1994 | Wicks |
| 5,460,706 A | | 10/1995 | Lisboa |
| 5,753,098 A | | 5/1998 | Bess, Jr. et al. |
| 6,007,693 A | | 12/1999 | Silveri |
| 6,096,202 A | | 8/2000 | Fulmer |
| 6,391,167 B1 | | 5/2002 | Grannersberger |
| 7,879,208 B2 | | 2/2011 | Wu et al. |
| 8,603,331 B1 | | 12/2013 | Koble |
| 8,920,615 B2 | | 12/2014 | Davidson et al. |
| 9,878,926 B2 | | 1/2018 | Heng et al. |
| 10,155,679 B2 | | 12/2018 | Mastio |
| 10,669,171 B2 | | 6/2020 | Heng et al. |
| 2004/0050789 A1 | * | 3/2004 | Ash ..................... A61M 1/3621 |
| | | | 210/646 |
| 2004/0108261 A1 | | 6/2004 | King et al. |
| 2006/0091002 A1 | * | 5/2006 | Hin ....................... C02F 1/4674 |
| | | | 204/245 |
| 2006/0125642 A1 | * | 6/2006 | Chandaria ........ G06K 19/07758 |
| | | | 340/572.8 |
| 2006/0249400 A1 | | 11/2006 | Bremauer |
| 2006/0266682 A1 | | 11/2006 | Kennedy et al. |
| 2007/0181439 A1 | | 8/2007 | Wu et al. |
| 2010/0250449 A1 | | 9/2010 | Doyle et al. |
| 2010/0313964 A1 | | 12/2010 | Hin et al. |
| 2011/0108489 A1 | * | 5/2011 | Fritze ..................... C02F 1/004 |
| | | | 210/709 |
| 2011/0180395 A1 | | 7/2011 | Tucker |
| 2011/0278158 A1 | | 11/2011 | Briggs et al. |
| 2011/0303543 A1 | * | 12/2011 | Fritze .................... B01D 35/06 |
| | | | 204/554 |
| 2013/0105372 A1 | | 5/2013 | Chen et al. |
| 2013/0105403 A1 | | 5/2013 | Chen et al. |
| 2014/0326680 A1 | * | 11/2014 | Mastio ..................... C25B 9/00 |
| | | | 210/747.5 |
| 2015/0176142 A1 | | 6/2015 | Lambert et al. |

FOREIGN PATENT DOCUMENTS

| | | |
|---|---|---|
| WO | 2011032212 | 3/2011 |
| WO | 2013110144 | 8/2013 |
| ZA | 201604232 | 8/2017 |

OTHER PUBLICATIONS

U.S. Appl. No. 14/335,996, Notice of Allowance dated Sep. 28, 2018, 7 pages.
U.S. Appl. No. 14/335,996, Notice of Allowance dated Feb. 13, 2018, 9 pages.
U.S. Appl. No. 14/335,996, Restriction Requirement dated Sep. 8, 2017, 7 pages.
U.S. Appl. No. 14/598,742, Corrected Notice of Allowability dated Oct. 11, 2017, 2 pages.
U.S. Appl. No. 14/598,742, Non-Final Office Action dated Apr. 20, 2017, 6 pages.
U.S. Appl. No. 14/598,742, Notice of Allowance dated Sep. 28, 2017, 5 pages.
U.S. Appl. No. 15/862,208, Non-Final Office Action dated Sep. 5, 2019, 15 pages.
U.S. Appl. No. 15/862,208, Notice of Allowance dated Jan. 29, 2020, 7 pages.
Australian Application No. AU2012900326, Search Report dated Jun. 6, 2012, 3 pages.
Australian Application No. AU2015206377, First Examination Report dated Feb. 5, 2018, 4 pages.
Australian Application No. AU2015206377, Notice of Acceptance dated Mar. 13, 2018, 3 pages.
Australian Application No. AU2018204452, First Examination Report dated Aug. 2, 2019, 6 pages.
Australian Application No. AU2018204452, Notice of Acceptance dated Jan. 24, 2020, 3 pages.
European Application No. EP15702080.1, Notice of Decision to Grant dated Jul. 26, 2018, 2 pages.
International Application No. PCT/AU2013/000076, International Search Report and Written Opinion dated Mar. 14, 2013, 12 pages.
International Application No. PCT/US2015/011761, International Preliminary Report on Patentability, dated Jul. 28, 2016, 11 pages.
International Application No. PCT/US2015/011761, International Search Report and Written Opinion dated May 4, 2015, 14 pages.
South African Application No. ZA201604232, Notice of Acceptance dated Jul. 11, 2017, 1 page.

* cited by examiner

CHLORINE-GENERATING ASSEMBLY

CROSS REFERENCE TO RELATED APPLICATIONS

This application is a continuation of U.S. patent application Ser. No. 15/862,208, filed Jan. 4, 2018, and titled "Devices and Methods for Monitoring Water Flow Through a Chlorine-Generating or Other Assembly," now allowed, which is a continuation of U.S. patent application Ser. No. 14/598,742, filed Jan. 16, 2015, and titled "Devices and Methods for Monitoring Water Flow Through a Chlorine-Generating or Other Assembly," now U.S. Pat. No. 9,878, 926, issued Jan. 30, 2018, which claims priority to U.S. Provisional Patent Application No. 61/928,469 filed Jan. 17, 2014 and titled "Method of Monitoring Flow Utilizing a Gas Trap Sensor at Low Flows," the entire contents of each of which are incorporated herein by reference.

TECHNICAL FIELD

The present disclosure generally relates to devices and methods for detecting and/or monitoring water flow through a chlorine-generating or other assembly.

BACKGROUND

During electrolytic purification of water, a flow stream from a body of water is passed through an electrolytic cell or other chlorine-generating assembly to oxide halide ions of the water by electrolysis to form hypohalic acid, hypohalite ions or both to disinfect or "chlorinate" the water. The treated flow stream is then returned to the body of water.

Some assemblies for chlorinating water by electrolysis include a flow sensor that senses if water is flowing through the assembly. Such a flow sensor, sometimes referred to as a gas trap sensor, includes an electrode that detects flow so long as there is conductivity between the electrode and one of the chlorine-generating electrode plates of the chlorine-generating assembly. The electrolytic process generates gas bubbles that are pushed out of the assembly by the water flow. When water is not flowing through the assembly, the generated gas bubbles build up and break the connection between the gas flow electrode and the chlorine-generating electrode plates. However, in low flow situations, for example water flowing at a rate lower than approximately 30 gallons per minute (GPM), gas continues to build in the flow sensor faster than the water flow can push it out. The buildup of gas breaks the connection between the gas flow electrode and the chlorine-generating electrode plates and the flow sensor is unable to sense the water flow and erroneously returns a "no flow" condition even though water is flowing through the assembly.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Aspects of the present disclosure relate to improved chlorine-generating assemblies and methods. More particularly, the assembly is designed in some embodiments so that a flow sensor is able to detect water flow even in low water flow situations, for example water flowing at a rate less than approximately 30 GPM. In some embodiments, the assembly includes a flow channel that narrows from an inlet end of the assembly to an outlet end of the assembly to increase the velocity of the water flowing through the flow channel. The assembly may also include a water delivery mechanism that facilitates the delivery of water through the flow sensor and thus allows the flow sensor to detect the water flow even in low flow situations. In some embodiments, the assembly is configured so that it can be locked and unlocked with a quarter turn. Further, in some embodiments, the assembly includes a keying feature that ensures the assembly is locked in the correct orientation.

BRIEF DESCRIPTION OF THE DRAWINGS

Illustrative embodiments of the present disclosure are described in detail below with reference to the following drawing figures.

DETAILED DESCRIPTION

Certain aspects and features of the present disclosure relate to apparatuses and methods for sanitizing and protecting water from the growth of microorganisms, such as bacteria, virii, fungi, algae, and the like. Such sanitation and protection can be used for water in a variety of applications, including swimming pools, hot tubs, spas, as well as wastewater treatment facilities, cooling towers, and the like.

Figure 1:
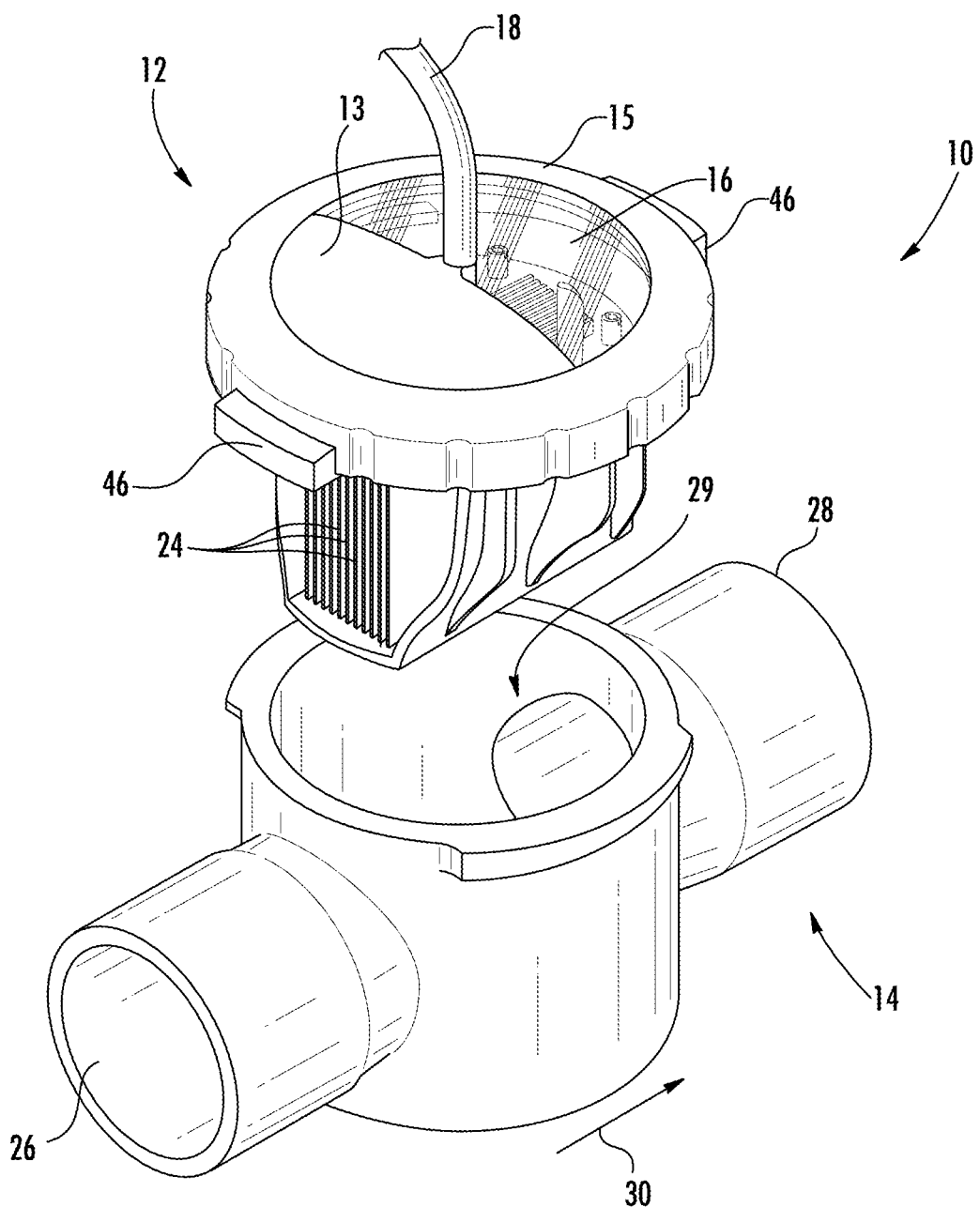
FIG. 1 is a perspective view of a chlorine-generating assembly according to one embodiment, shown with the upper and lower portions disassembled.

FIG. 1 illustrates one non-limiting example of a chlorine-generating assembly 10. Chlorine-generating assembly 10 includes an upper portion 12 and a lower portion 14. Chlorine-generating assembly 10 includes a flow channel 32 (FIG. 3), through which a plurality of chlorine-generating electrode plates 24 generally extend. Chlorine-generating electrode plates 24 may be formed of any suitable material, including but not limited to, titanium and may be uncoated or coated with a precious or semi-precious metal, such as platinum, ruthenium, or iridium.

The lower portion 14 includes an inlet 26, an outlet 28, and a cavity 29 between inlet 26 and outlet 28. When upper portion 12 and lower portion 14 are assembled together, the flow channel 32 is received within cavity 29 of lower portion 14. Since upper portion 12 is removable with respect to lower portion 14, the chlorine-generating electrode plates 24 can be easily accessed and repaired or replaced when needed. Although illustrated as a two-piece assembly, chlorine generating assembly may have any suitable configuration and is not limited to the disclosed two-piece arrangement.

Figure 4:
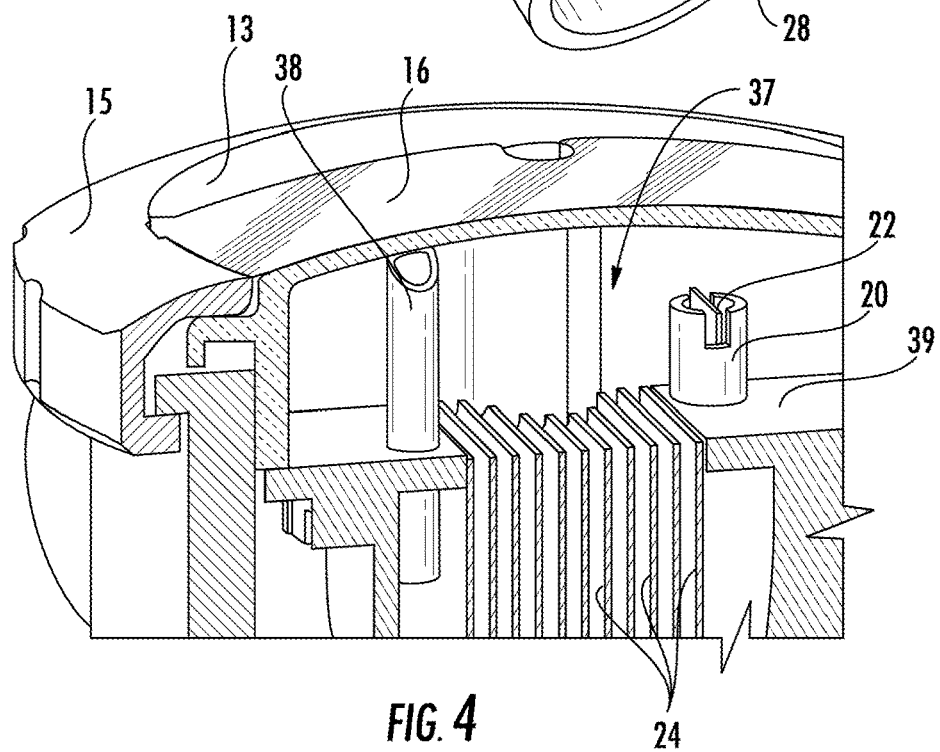
FIG. 4 is a partial cut-away view of the chlorine-generating assembly of FIG. 1.

Assembly 10 is designed so that water flows through flow channel 32, and thus across chlorine-generating electrode plates 24, in a flow direction 30. As shown in FIG. 4, upper portion 12 also includes a chamber 37 that is separated from flow channel 32 by a plate 39. A venturi tube 38 and a flow sensor 20 extend through plate 39 and are in fluid communication with both the chamber 37 and the flow channel 32. Flow sensor 20 includes a flow sensor electrode 22. When conductivity exists in water flowing between flow sensor electrode 22 and chlorine-generating electrode plates 24, the flow sensor 20 senses water flow and returns a flow condition. When the connection between the flow sensor electrode 22 and the chlorine-generating electrode plates 24 is broken, the flow sensor 20 is unable to sense water flow and returns a no-flow condition, even if water is flowing through flow channel 32. The connection can be broken, for example, when gas bubbles generated as part of the chlorine-generating electrolytic process build up in the assembly 10 faster than the water flow pushes them and break the connection between the flow sensor electrode 22 and the chlorine-generating electrode plates 24. When water is flowing through the flow channel 32 at a sufficient rate (in some cases, at a rate of approximately 30 GPM or above), the venturi tube 38 evacuates air from the chamber 37 and water moves through flow sensor 20 into chamber 37. As water moves through flow sensor 20, the water pushes gas bubbles generated as part of the electrolytic process out of the assembly at a faster rate than the gas bubbles are produced so that water continually covers the flow sensor electrode 22 and a connection is maintained between the flow sensor electrode 22 and the chlorine-generating electrode plates 24. Therefore, the flow sensor 20 senses flow and returns a flow condition.

Figure 3:
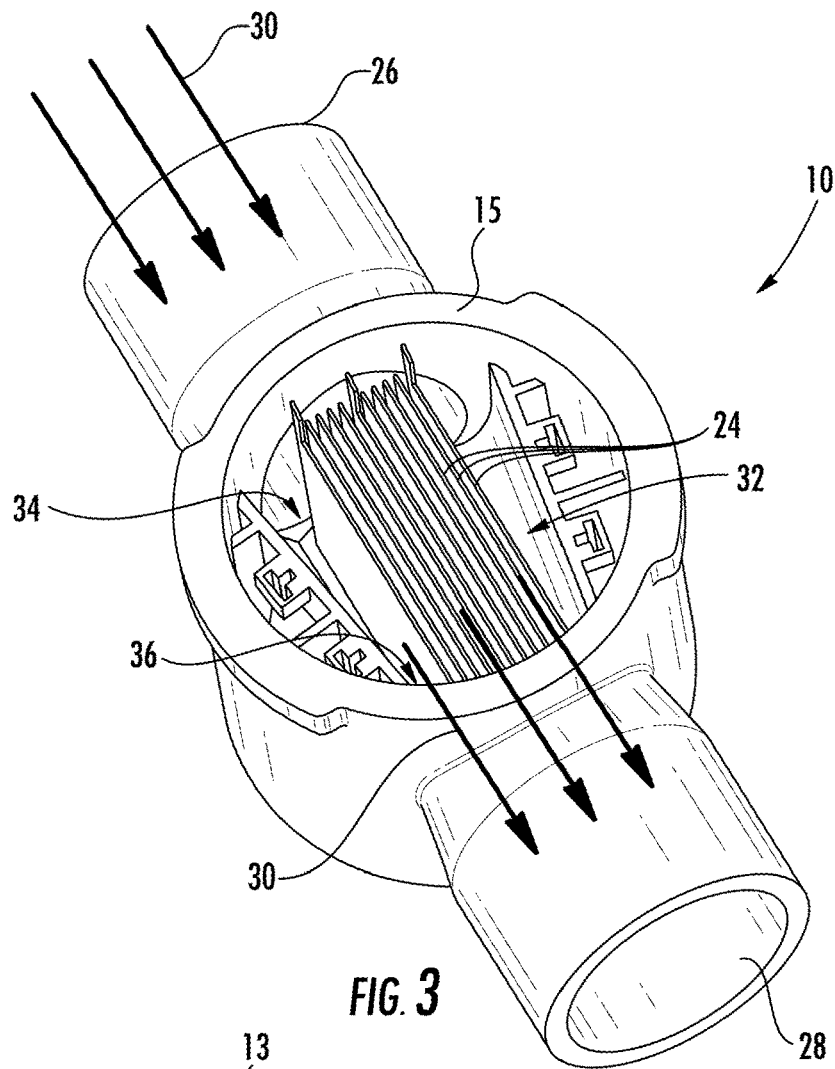
FIG. 3 is a top cut-away perspective view of select components of the chlorine-generating assembly of FIG. 1.
Figure 5:
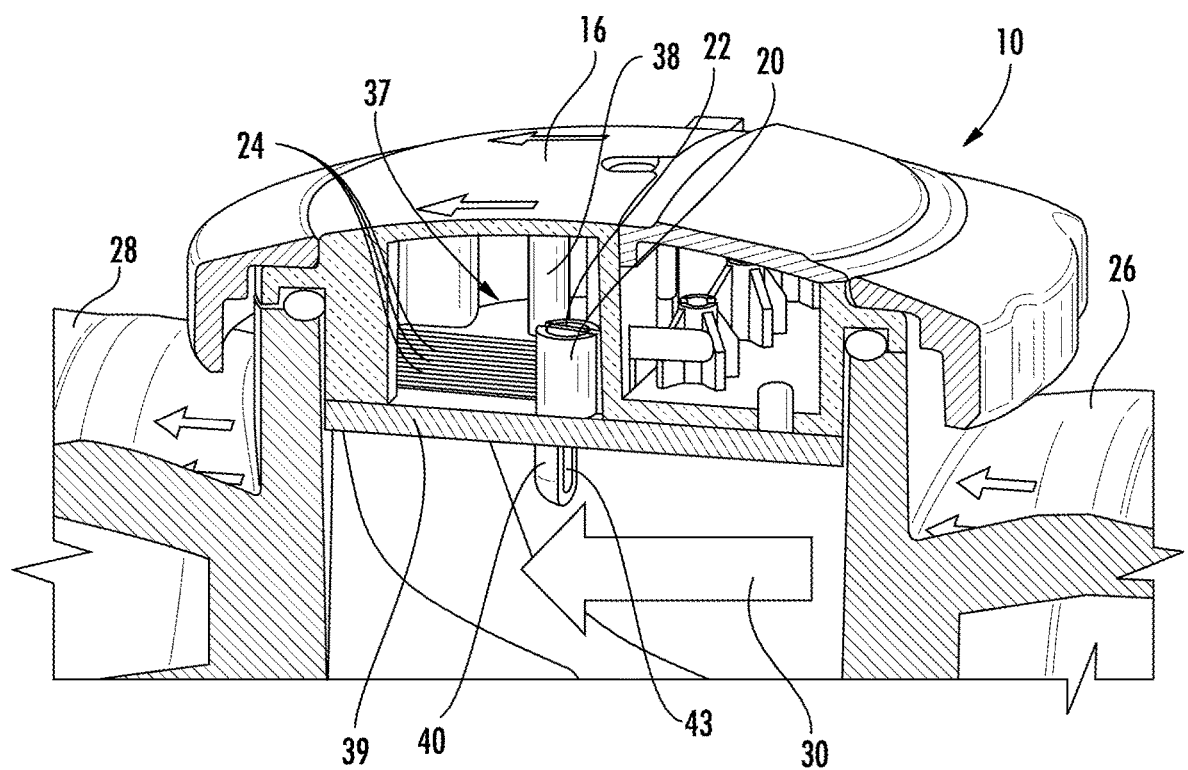
FIG. 5 is a partial cut-away schematic of the chlorine-generating assembly of FIG.

In some embodiments, as shown in FIG. 3, the flow channel 32 narrows from the inlet side 34 of the channel 32 toward the outlet side 36 of the channel 32. The narrowing of the flow channel 32 causes the velocity of the water to increase as it flows through the flow channel 32. The assembly 10 also includes a water delivery mechanism 40, shown in FIG. 5. As illustrated, the longitudinal axis of the water delivery mechanism 40 is generally aligned with at least a portion of the flow sensor electrode 22 of the flow sensor 20, although water delivery mechanism 40 can be aligned differently.

Water delivery mechanism 40 is designed to act as a fountain that helps direct water flowing through flow channel 32 into contact with flow sensor electrode 22 of flow sensor 20, even in low flow situations and even when air is present inside chamber 37. In this way, the water delivery mechanism 40 helps bridge any gaps between the flow sensor electrode 22 and the chlorine-generating electrode plates 24 so that the flow sensor 20 senses water flow even in low flow situations, such as under approximately 30 GPM or even as low as approximately 10 GPM or lower. In some embodiments, water delivery mechanism 40 includes a scooped portion 43 configured to scoop up water flowing through flow channel 32 and direct it to flow sensor electrode 22. As illustrated, the scooped portion 43 is positioned so that water flowing through flow channel 32 contacts the concave surface of the scooped portion 43 and travels upward toward flow sensor electrode 22. Because the flow channel 32 narrows, the water flow velocity increases and even more water is pushed across flow sensor electrode 22 via the water delivery mechanism 40.

Figure 2:
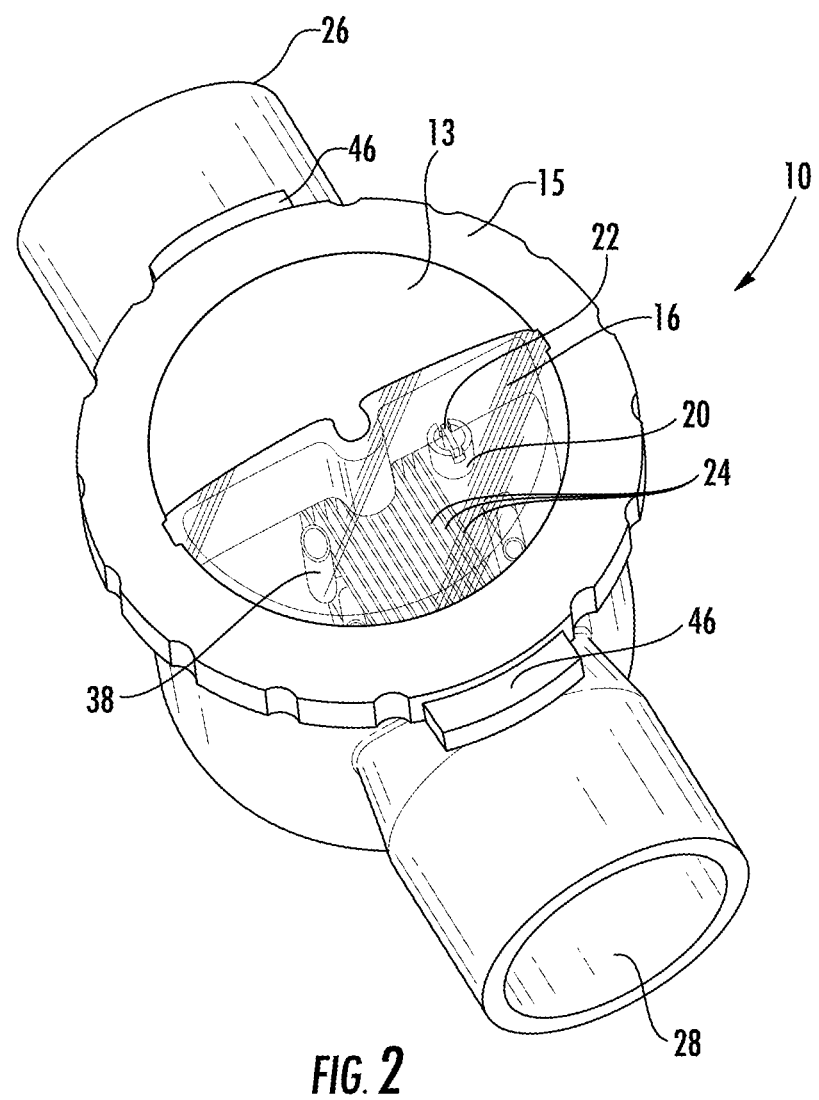
FIG. 2 is a top perspective view of the chlorine-generating assembly of FIG. 1, shown with the upper and lower portions assembled together.

In some cases, as shown in FIGS. 1-2, upper portion 12 includes a collar 15 that is rotatable with respect to a top surface 13 of the upper portion 12 and thus with respect to chlorine-generating electrode plates 24. Top surface 13 may also include a viewing window 16 that is at least partially transparent so that at least some of the internal components may be viewed when the assembly 10 is assembled. For example, in some embodiments, the lower portion 14 is opaque and the transparent viewing window 16 is arranged so that at least part of the top surfaces of the chlorine-generating electrode plates 24 is visible when the chlorine-generating electrode plates 24 are disposed within the opaque lower portion 14. As shown in FIGS. 1-2, a cable 18 may extend through the top surface 13 of the upper portion 12.

Figure 6:
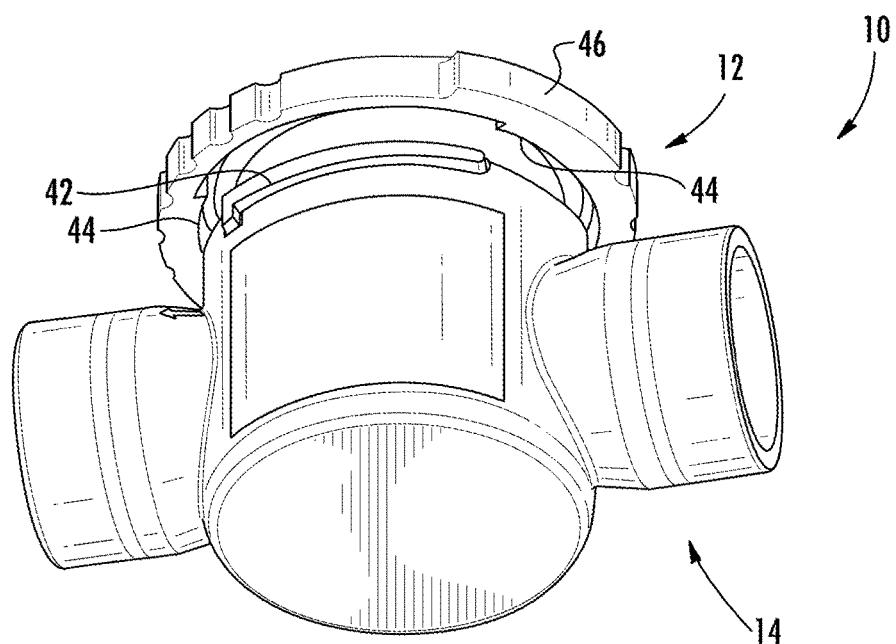
FIG. 6 is a bottom perspective view of the chlorine-generating assembly of FIG. 1, shown with the upper and lower portions positioned with respect to one another.
Figure 7A:
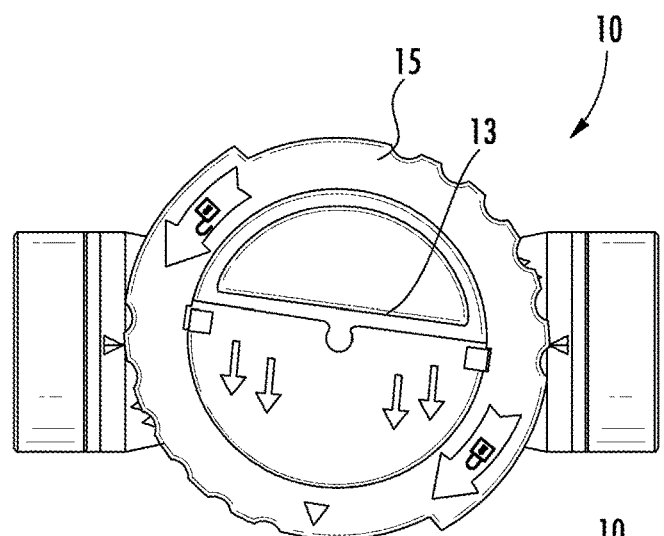
FIG. 7A is a top view of the chlorine-generating assembly of FIG. 1, shown with the upper and lower portions assembled together and in an unlocked position.
Figure 7B:
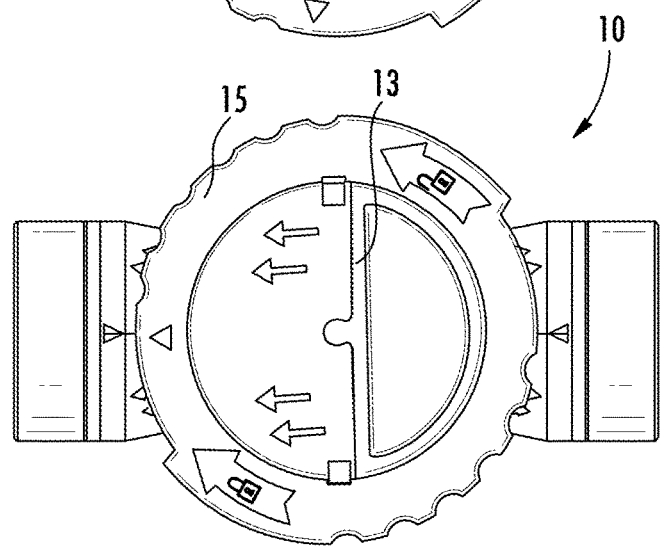
FIG. 7B is a top view of the chlorine-generating assembly of FIG. 1, shown with the upper and lower portions assembled together and in a locked position.

Non-limiting embodiments of assembly 10 can include various other features if desired. For example, upper portion 12 and lower portion 14 can be designed to move into a locked position with a quarter-turn of the upper portion 12 relative to the lower portion 14, as illustrated in FIGS. 7a-7b. Specifically, as shown in FIG. 6, collar 15 of upper portion 12 can include two or more abutments 44 that rotatably lock with respect to two or more flanges 42 of lower portion 14. In other embodiments, collar 15 of upper portion 12 includes flanges 42 and lower portion 14 includes abutments 44. As mentioned above, collar 15 is rotatable with respect to top surface 13 and chlorine-generating electrode plates 24. Once chlorine-generating electrode plates 24 are positioned within lower portion 14, collar 15 can be rotated with respect to chlorine-generating electrode plates 24 and lower portion 14 to lock or unlock the assembly. Specifically, when each abutment 44 is aligned with one of the flanges 42, the upper portion 12 is locked with respect to the lower portion 14. In some embodiments, the two abutments 44 are approximately 180 degrees from one another and the two flanges 42 are approximately 180 degrees from one another. To unlock the upper portion 12 with respect to the lower portion 14, one of the portions is rotated with respect to the other portion about a longitudinal axis of the portion until the abutments 44 are no longer aligned with the two flanges 42. In some embodiments, the upper portion 12 is rotated approximately 90 degrees relative to the lower portion 14. Such a design allows the assembly 10 to be assembled into a locked position and disassembled without requiring the use of tools. Collar 15 of upper portion 12 may also include gripping tabs 46 that facilitate locking and unlocking of the assembly.

Figure 8:
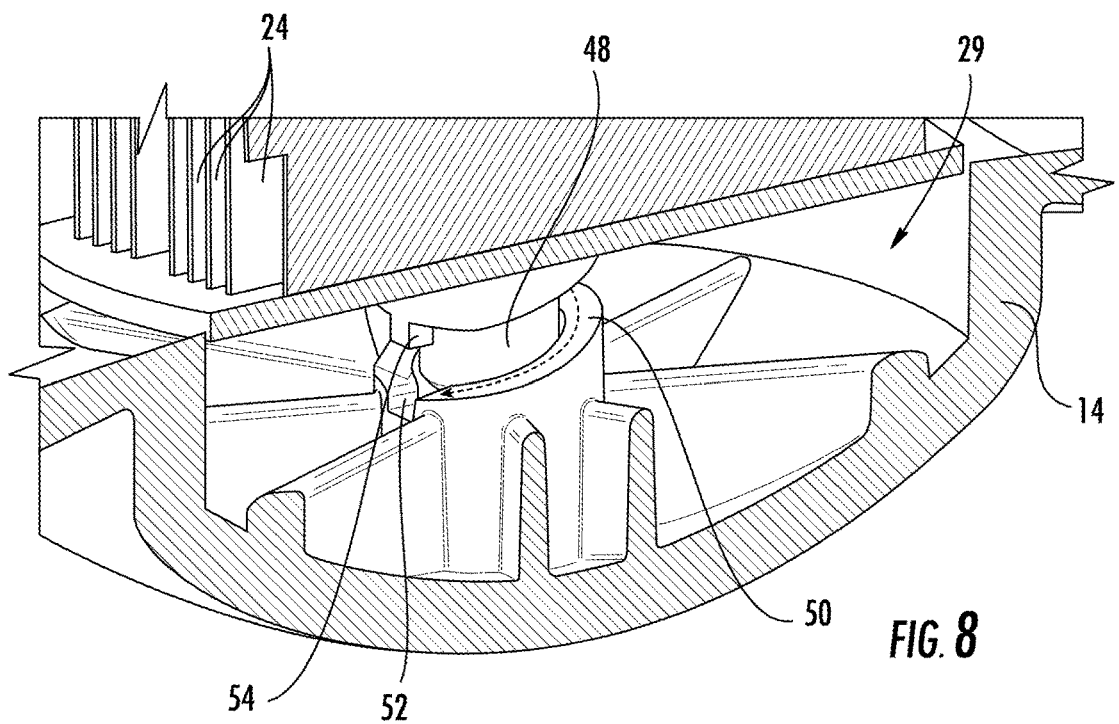
FIG. 8 is a partial cutaway view of a locking key of a chlorine-generating assembly according to one embodiment.
Figure 9:
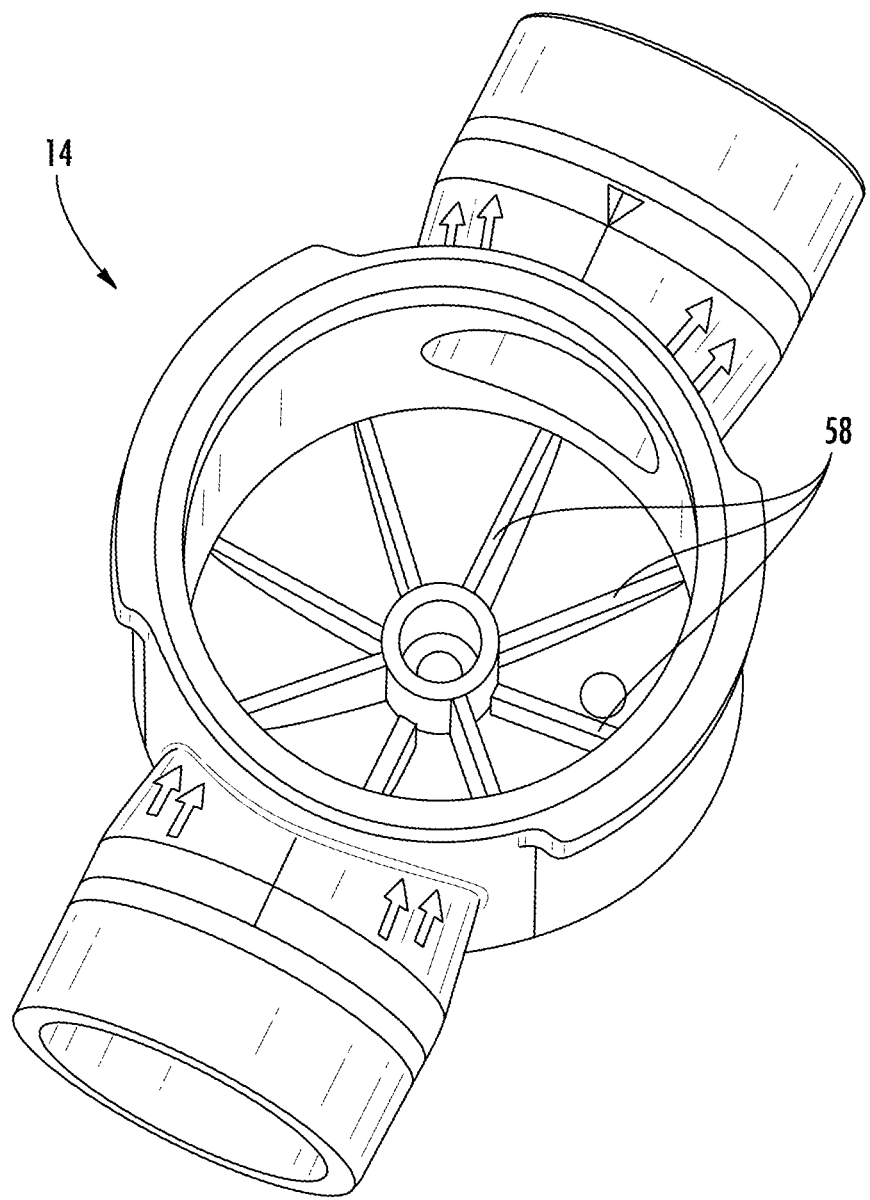
FIG. 9 is a top perspective view of a lower portion according to one embodiment.
Figure 10:
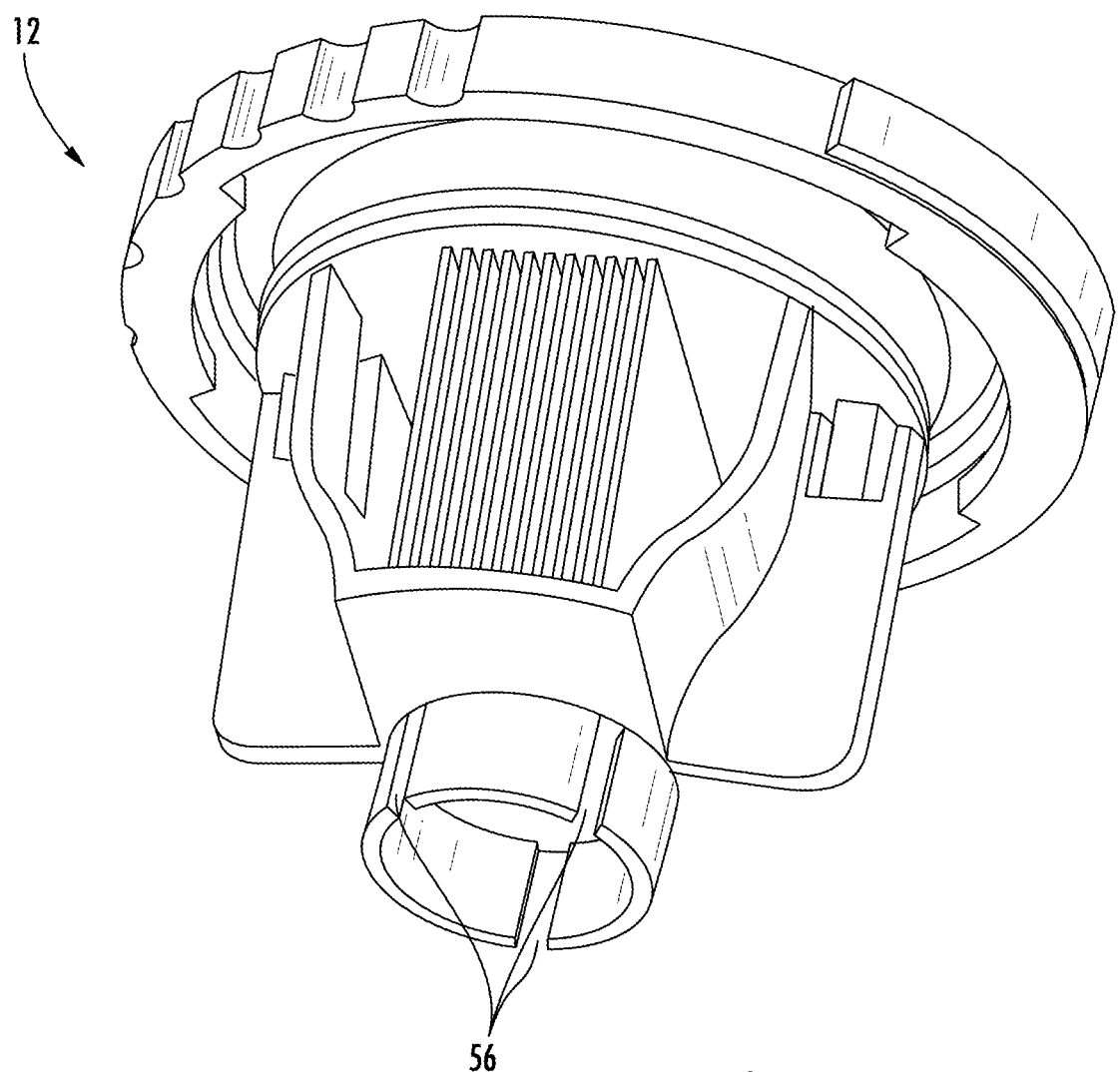
FIG. 10 is a bottom perspective view of an upper portion according to one embodiment.

The chlorine-generating assembly 10 described above is configured such that water must flow in a particular flow direction 30 to function properly. Therefore, it is important that the upper portion 12 be assembled correctly with respect to the lower portion 14 so that the water flows in flow direction 30 through upper portion 12. To ensure that the upper portion 12 (and, in turn, its water delivery mechanism 40 and narrowing flow channel 32) are installed correctly, the assembly 10 may include a key feature that ensures upper portion 12 is aligned correctly with respect to lower portion 14. If included, the key feature can take any suitable form. One of many examples is illustrated in FIG. 8. As shown in FIG. 8, cavity 29 of lower portion 14 includes a ramped surface 50 and a recess 52. A protrusion 48 extending from the bottom surface of upper portion 12 includes a tab 54 that is configured to slide along ramped surface 50 and be guided into recess 52. When tab 54 is received within recess 52, the assembly 10 is assembled correctly and the lower portion 14 and upper portion 12 are capable of being locked together by rotating collar 15 relative to lower portion 14 as described above. In another non-limiting embodiment, protrusion 48 includes a plurality of slots 56 that receive a corresponding plurality of ribs 58 projecting from cavity 29 of lower portion 14 when the assembly 10 is assembled correctly. When the upper portion 12 is assembled incorrectly (i.e., the water delivery mechanism 40 and flow channel 32 are not aligned correctly with respect to the lower portion 14), the ribs 58 are not received in the slots 56 and prevent locking of the upper portion 12 with the lower portion 14. These key features are illustrative only; numerous other key features may be used instead to ensure that upper portion 12 is assembled properly with respect to lower portion 14.

Although the narrowing flow channel and water delivery mechanism, which both facilitate detection of water flow in low flow situations, have been described above with respect to a chlorine-generating assembly, they can be incorporated into any suitable structure when it is desired that flow be sensed in low flow situations. Moreover, any or all of the disclosed features may be used with any chlorine-generating assembly or other suitable structure and are not limited to use with the specific assembly 10 depicted and described herein.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A chlorine-generating assembly comprising:
   an upper portion comprising a plurality of chlorine-generating electrode plates; and
   a lower portion comprising an inlet, an outlet and a flow channel that extends between the inlet and the outlet, wherein:
      the plurality of chlorine-generating electrode plates are positioned at least partially within the flow channel;
      the chlorine-generating assembly is configured to move between an unlocked position in which the upper portion is rotatable relative to the lower portion and a locked position in which the upper portion is restricted from rotating relative to the lower portion; and
      a quarter-turn of the upper portion relative to the lower portion moves the chlorine-generating assembly between the unlocked position and the locked position.

2. The chlorine-generating assembly of claim 1, wherein the upper portion comprises a transparent portion arranged so that at least part of a top surface of the plurality of chlorine-generating electrode plates is visible through the transparent portion when the plurality of chlorine-generating electrode plates are disposed within the flow channel.

3. The chlorine-generating assembly of claim 1, wherein a cable extends out of a top surface of the upper portion.

4. The chlorine-generating assembly of claim 3, wherein at least a portion of the top surface is transparent.

5. The chlorine-generating assembly of claim 1, wherein the flow channel narrows from the inlet toward the outlet.

6. A chlorine-generating assembly comprising:
   an upper portion comprising a plurality of chlorine-generating electrode plates; and
   a lower portion comprising an inlet, an outlet and a flow channel that extends between the inlet and the outlet, wherein:
      the plurality of chlorine-generating electrode plates are positioned at least partially within the flow channel so an axis intersecting both the inlet and the outlet passes through the plurality of chlorine-generating electrode plates;
      the chlorine-generating assembly is configured to move between an unlocked position in which the upper portion is rotatable relative to the lower portion and a locked position in which the upper portion is restricted from rotating relative to the lower portion; and
      a quarter-turn of the upper portion relative to the lower portion moves the chlorine-generating assembly between the unlocked position and the locked position.

7. The chlorine-generating assembly of claim 6, wherein the upper portion comprises a transparent portion arranged so that at least part of a top surface of the plurality of chlorine-generating electrode plates is visible through the transparent portion when the plurality of chlorine-generating electrode plates are disposed within the flow channel.

8. The chlorine-generating assembly of claim 6, wherein a cable extends out of a top surface of the upper portion.

9. The chlorine-generating assembly of claim 8, wherein at least part of the top surface is transparent.

10. The chlorine-generating assembly of claim 6, wherein the flow channel narrows from the inlet toward the outlet.

11. A chlorine-generating assembly comprising:
    an upper portion comprising a plurality of chlorine-generating electrode plates, wherein a top surface of the upper portion is transparent; and
    a lower portion comprising an inlet, an outlet and a flow channel that extends between the inlet and the outlet, wherein:
       the plurality of chlorine-generating electrode plates are positioned at least partially within the flow channel;
       the chlorine-generating assembly is configured to move between an unlocked position in which the upper portion is rotatable relative to the lower portion and a locked position in which the upper portion is restricted from rotating relative to the lower portion; and
       a quarter-turn of the upper portion relative to the lower portion moves the chlorine-generating assembly between the unlocked position and the locked position.

12. The chlorine-generating assembly of claim 11, wherein the plurality of chlorine-generating electrode plates are positioned at least partially within the flow channel so an axis intersecting both the inlet and the outlet passes through the plurality of chlorine-generating electrode plates.

13. The chlorine-generating assembly of claim 11, wherein a cable extends out of the top surface of the upper portion.

14. The chlorine-generating assembly of claim 11, wherein the flow channel narrows from the inlet toward the outlet.

\* \* \* \* \*